United States Patent
Hurd et al.

(10) Patent No.: US 10,212,722 B2
(45) Date of Patent: Feb. 19, 2019

(54) VOLUME-DEADLINE SCHEDULING

(71) Applicant: Telefonaktiebolaget LM Ericsson (publ), Stockholm (SE)

(72) Inventors: Magnus Hurd, Stockholm (SE); Christian Skärby, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/310,581

(22) PCT Filed: Jun. 27, 2014

(86) PCT No.: PCT/IB2014/062683
§ 371 (c)(1),
(2) Date: Nov. 11, 2016

(87) PCT Pub. No.: WO2015/198102
PCT Pub. Date: Dec. 30, 2015

(65) Prior Publication Data
US 2017/0086215 A1    Mar. 23, 2017

(51) Int. Cl.
*H04W 72/12*    (2009.01)
*H04W 28/02*    (2009.01)
(Continued)

(52) U.S. Cl.
CPC ......... *H04W 72/1221* (2013.01); *H04L 47/56* (2013.01); *H04L 47/6275* (2013.01); *H04W 28/0268* (2013.01); *H04W 72/1242* (2013.01)

(58) Field of Classification Search
None
See application file for complete search history.

(56) References Cited

U.S. PATENT DOCUMENTS

2003/0231594 A1* 12/2003 Xu ............... H04L 1/1877
370/236
2007/0253449 A1* 11/2007 Das .............. H04L 47/10
370/498
(Continued)

FOREIGN PATENT DOCUMENTS

EP    1278390 A1 *  1/2003    ............ H04L 29/06
EP    1278390 A1     1/2003
(Continued)

OTHER PUBLICATIONS

Author Unknown, "Technical Specification Group Services and System Aspects; Policy and charging control architecture (Release 11)," Technical Specification 23.203, Version 11.8.0, 3GPP Organizational Partners, Dec. 2012, 179 pages.
(Continued)

*Primary Examiner* — Jamaal R Henson
(74) *Attorney, Agent, or Firm* — Withrow & Terranova, PLLC (57) ABSTRACT

A method of operating a radio access node for a wireless communications network includes the steps of obtaining a total volume of data content for a transfer of the data content between the radio access node and a wireless communications device, obtaining a transfer deadline for the transfer of the data content, calculating a prioritization metric for the transfer of the data content based on the total volume of the data content and the transfer deadline, and scheduling one or more radio resources for the transfer of the data content based on the prioritization metric.

21 Claims, 9 Drawing Sheets

(51) Int. Cl.
  *H04L 12/875*   (2013.01)
  *H04L 12/865*   (2013.01)

(56) References Cited

U.S. PATENT DOCUMENTS

| | | | |
|---|---|---|---|
| 2010/0020756 A1* | 1/2010 | Kennedy | H04W 4/20 |
| | | | 370/329 |
| 2010/0278152 A1* | 11/2010 | Andreozzi | H04L 1/1887 |
| | | | 370/335 |
| 2012/0100879 A1 | 4/2012 | Tine et al. | |
| 2012/0155363 A1 | 6/2012 | Moon et al. | |
| 2013/0148597 A1 | 6/2013 | Lee et al. | |
| 2013/0290492 A1* | 10/2013 | ElArabawy | H04L 65/80 |
| | | | 709/219 |
| 2015/0092590 A1* | 4/2015 | Zhu | A61M 11/001 |
| | | | 370/253 |
| 2015/0092701 A1 | 4/2015 | Horn et al. | |
| 2015/0098415 A1* | 4/2015 | Chen | H04L 5/0035 |
| | | | 370/329 |
| 2015/0350918 A1* | 12/2015 | Rashid | H04W 16/14 |
| | | | 370/329 |

FOREIGN PATENT DOCUMENTS

| | | |
|---|---|---|
| WO | 2007087057 A2 | 8/2007 |
| WO | 2013165284 A1 | 11/2013 |
| WO | 2015198099 A1 | 12/2015 |

OTHER PUBLICATIONS

Author Unknown, "Technical Specification Group Services and System Aspects; Policy and charging control architecture (Release 12)," Technical Specification 23.203, Version 12.0.0, 3GPP Organizational Partners, Mar. 2013, 183 pages.

Author Unknown, "Technical Specification Group Services and System Aspects; General Packet Radio Service (GPRS) enhancements for Evolved Universal Terrestrial Radio Access Network (E-UTRAN) access (Release 11)," Technical Specification 23.401, Version 11.4.0, 3GPP Organizational Partners, Dec. 2012, 284 pages.

Author Unknown, "Technical Specification Group Core Network and Terminals; Policy and Charging Control signalling flows and Quality of Service (QoS) parameter mapping (Release 12)," Technical Specification 29.213, Version 12.3.0, 3GPP Organizational Partners, Mar. 2014, 204 pages.

Author Unknown, "Technical Specification Group Core Network and Terminals; Policy and Charging Control over Rx reference point (Release 12)," Technical Specification 29.214, Version 12.3.0, 3GPP Organizational Partners, Mar. 2014, 59 pages.

Author Unknown, "Technical Specification Group Radio Access Network; Evolved Universal Terrestrial Radio Access Network (E-UTRAN); S1 Application Protocol (S1AP) (Release 11)," Technical Specification 36.413, Version 11.2.0, 3GPP Organizational Partners, Dec. 2012, 272 pages.

Author Unknown, "Technical Specification Group Radio Access Network; Evolved Universal Terrestrial Radio Access Network (E-Utran); S1 Application Protocol (S1AP) (Release 12)," Technical Specification 36.413, Version 12.1.0, 3GPP Organizational Partners, Mar. 2014, 285 pages.

Author Unknown, "Technical Specification Group Radio Access Network; Evolved Universal Terrestrial Radio Access Network (E-UTRAN); X2 application protocol (X2AP) (Release 11)," Technical Specification 36.423, Version 11.3.0, 3GPP Organizational Partners, Dec. 2012, 141 pages.

International Search Report and Written Opinion for International Patent Application No. PCT/IB2014/062838, dated Mar. 20, 2015, 13 pages.

International Search Report and Written Opinion for International Patent Application No. PCT/IB2014/062683, dated Mar. 19, 2015, 11 pages.

Author Unknown, "Technical Specification Group Services and System Aspects; General Packet Radio Service (GPRS) enhancements for Evolved Universal Terrestrial Radio Access Network (E-UTRAN) access (Release 11)," Technical Specification 23.401, Version 11.5.0, 3GPP Organizational Partners, Mar. 2013, 286 pages.

Author Unknown, "Technical Specification Group Radio Access Network; Evolved Universal Terrestrial Radio Access Network (E-UTRAN); S1 Application Protocol (S1AP) (Release 11)," Technical Specification 36.413, Version 11.3.0, 3GPP Organizational Partners, Mar. 2013, 274 pages.

Non-Final Office Action for U.S. Appl. No. 15/314,601, dated Mar. 13, 2018, 25 pages.

Final Office Action for U.S. Appl. No. 15/314,601, dated Sep. 26, 2018, 33 pages.

\* cited by examiner

FIG. 8 ated on a 35 U.S.C. § 371 national phase filing of International Application No. PCT/IB2014/062683, filed Jun. 27, 2014, the disclosure of which is incorporated herein by reference in its entirety.

VOLUME-DEADLINE SCHEDULING

This application is a 35 U.S.C. § 371 national phase filing of International Application No. PCT/IB2014/062683, filed Jun. 27, 2014, the disclosure of which is incorporated herein by reference in its entirety.

FIELD OF THE DISCLOSURE

The present disclosure relates to resource scheduling for a wireless communications network. Specifically, the present disclosure relates to resource scheduling for a wireless communications network in order to ensure one or more transfers of data content are completed before a specified transfer deadline.

BACKGROUND

Wireless communications networks continue to provide access to an increasing number of resources and services. In many cases, a resource or service may demand a minimum quality of service (QoS) in order to deliver a desirable user experience. For example, real-time multimedia applications such as audio streaming, video streaming, and voice over internet protocol (VoIP) communications may demand a relatively high QoS in order to avoid delays in the delivery of content, which may be highly disruptive to an end user. Generally, radio resources in a wireless communications network are allocated via the establishment of one or more radio access bearers (RABs) between a radio access node and a wireless communications device. Each RAB is assigned certain QoS parameters, which are used by a scheduler in the radio access node to ensure that a minimum QoS is delivered for traffic over the RAB.

Figure 1:
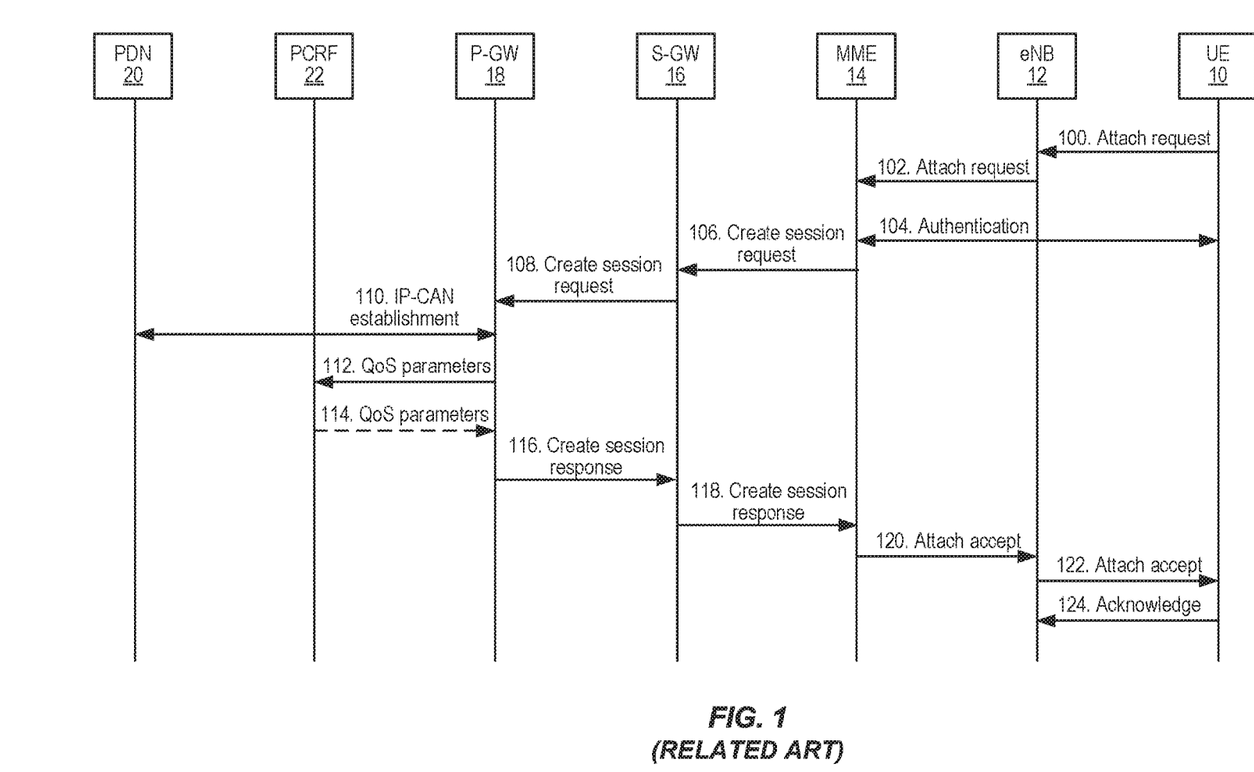
FIG. 1 is a call flow diagram illustrating a conventional LTE attach procedure.

In an LTE network, one or more evolved RABs (E-RABs) may be established in what is known as an attach procedure, as illustrated in the call flow diagram shown in FIG. 1. First, an attach request is sent from user equipment (UE) 10 to an evolved node B (eNB) 12 (step 100). The attach request is forwarded from the eNB 12 to a mobility management entity (MME) 14 (step 102). The UE 10 is then authenticated by the MME 14 (step 104), which may involve one or more external nodes such as a home subscriber server (not shown). Next, a create session request is sent from the MME 14 to a selected serving gateway (S-GW) 16, indicating the address of a packet data network (PDN) gateway (P-GW) 18 with which a connection is desired and one or more desired QoS parameters for the E-RAB that will serve the connection (step 106). The S-GW 16 then forwards the create session request to the indicated P-GW 18 (step 108). In response to the create session request, the P-GW 18 performs an IP connectivity access network (IP-CAN) establishment procedure (step 110). As part of the IP-CAN establishment procedure, the requested QoS parameters are provided from the P-GW 18 to a policy charging and rules function (PCRF) 20 (step 112). The PCRF 20 may then optionally modify the QoS parameters as indicated by one or more preconfigured settings based on the requested resource and/or service, and send back one or more updated QoS parameters to the P-GW 18 (step 114).

A create session response is then sent from the P-GW 18 to the S-GW 16, which contains the QoS information for the requested resource or service and an IP address for the UE 10 (step 116). The create session response is forwarded from the S-GW 16 to the MME 14 (step 118). If the QoS parameters for the create session response indicate that a guaranteed bitrate (GBR) E-RAB is to be established, the MME 14 together with the eNB 12 may then perform admission control to determine if the necessary resources are present to establish a bearer with the required QoS. If the necessary resources are available, and/or if the QoS parameters for the bearer indicate that a non-GBR bearer is to be established, an attach accept message is sent from the MME 14 to the eNB 12 and the S-GW 16 at which point the eNB 12 may perform admission control based on the QoS required for the requested bearers (step 120). The attach message is forwarded from the eNB 12 to the UE 10 (step 122). In response to the attach message, the UE 10 sends and acknowledgement message (step 124), at which point in time an E-RAB is established between the UE 10 and the P-GW 18. Additional messages may then be exchanged between one or more network nodes in the LTE network order to complete the attach process.

The QoS parameters for the E-RAB are generally indicated by a QoS class identifier (QCI), which may define a resource type (GBR or non-GBR), a priority, a packet delay budget (PDB), a packet error loss rate (PELR), a guaranteed uplink/downlink bitrate, and a maximum uplink/downlink bitrate for the E-RAB. Generally, a QCI represents a preconfigured QoS for a wide range of resources and/or services that may be accessed via a particular E-RAB. Based on one or more of the QoS parameters in a QCI for a particular E-RAB, radio resources in a wireless communications network are scheduled. One common scheduling strategy known as delay-based scheduling involves increasing the priority of a packet as the time the packet has spent in a scheduling queue starts to approach the specified PDB for traffic on the E-RAB. While effective in some applications, a delay-based scheduling strategy based on the QoS parameters discussed above is not well suited to transfers of data content that must be finished before a certain transfer deadline. Further, such a delay-based scheduling strategy is generally over-aggressive, often scheduling radio resources unnecessarily and therefore overburdening a wireless communications network.

Accordingly, there is a present need for a scheduling strategy capable of ensuring that one or more transfers of data content can complete before a transfer deadline, while simultaneously increasing the efficiency of radio resource allocation in a wireless communications network.

SUMMARY

The present disclosure relates to resource scheduling for a wireless communications network in order to ensure one or more transfers of data content are completed before a specified transfer deadline. In one embodiment, a method of operating a radio access node for a wireless communications network includes the steps of obtaining a total volume of data content for a transfer of the data content between the radio access node and a wireless communications device, obtaining a transfer deadline for the transfer of the data content, calculating a prioritization metric for the transfer of the data content based on the total volume of the data content and the transfer deadline, and scheduling one or more radio resources for the transfer of the data content based on the prioritization metric. By using the prioritization metric to schedule one or more radio resources for the transfer of the data content, the transfer of the data content can be completed before the transfer deadline. Further, by calculating the prioritization metric based on the total volume of the data content and the transfer deadline, the efficiency of radio resource allocation for the transfer of the data content can be increased because other services (experiencing better radio conditions) can utilize the resources not needed to fulfill the deadline of the deadline transfer.

In one embodiment, an updated prioritization metric for the transfer of the data content is calculated based on an estimate of the remaining portion of the total volume of the data content to be transferred and the remaining time until the transfer deadline for the transfer of the data content, and one or more radio resources for the transfer of the data content are scheduled based on the updated scheduling priority. By scheduling one or more radio resources based on the updated prioritization metric, the efficiency of radio resource allocation can be increased, while simultaneously ensuring that the transfer of the data content is completed before the transfer deadline.

In one embodiment, the updated prioritization metric is calculated periodically. For example, the updated prioritization metric may be calculated every N transmission time intervals (TTIs), where N is an integer greater than or equal to one. Calculating the updated prioritization metric every N TTIs increases the efficiency of radio resource allocation in the wireless communications network, while simultaneously ensuring that the transfer of the data content is completed before the transfer deadline.

In one embodiment, the updated prioritization metric is calculated whenever a partial transfer of the data content has occurred. The updated prioritization metric is calculated based on the remaining portion of the total volume of the data content due to the partial data transfer. Updating the prioritization metric whenever a partial transfer of the data content has occurred increases the efficiency of radio resource allocation in the wireless communications network, while simultaneously ensuring that the transfer of the data content is completed before the transfer deadline.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 2A:
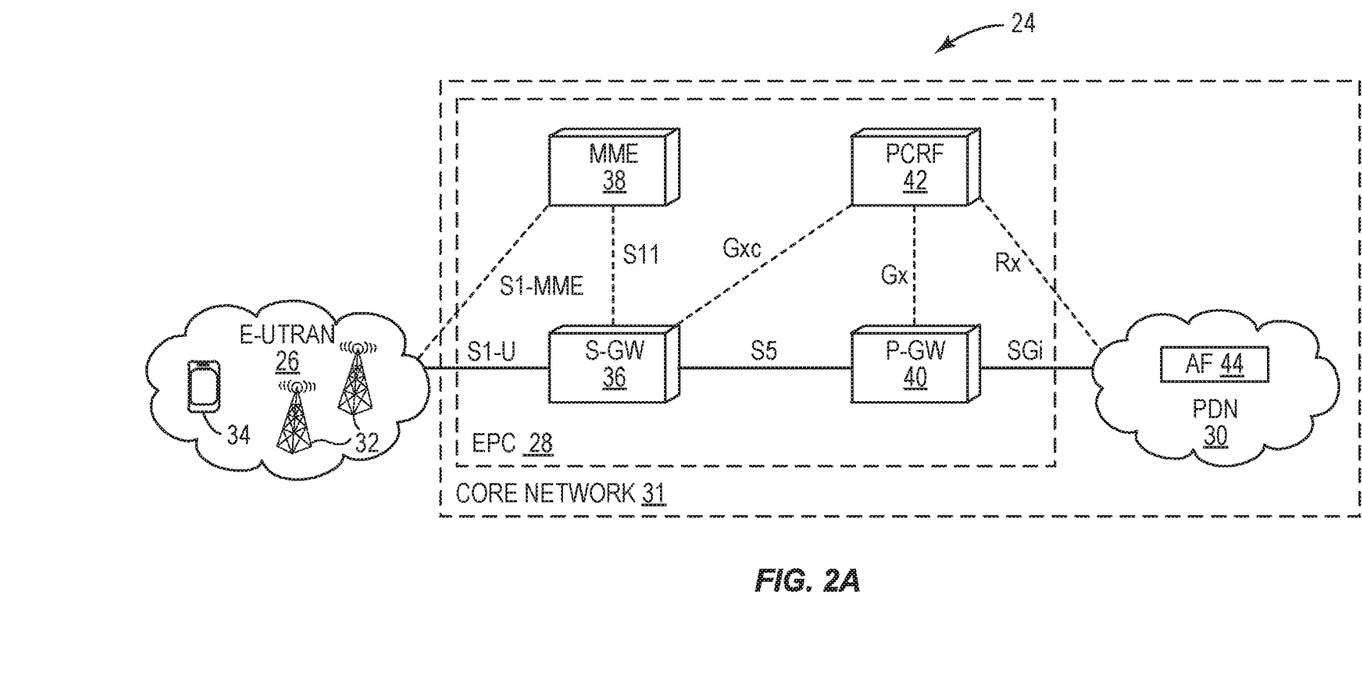
FIG. 2A is a block diagram illustrating a long term evolution (LTE) communications network, which may be used according to the principles described in the present disclosure to ensure that a transfer of data content is completed before a transfer deadline while efficiently allocating radio resources for the transfer of the data content.

FIG. 2A shows a long term evolution (LTE) communications network 24 according to one embodiment of the present disclosure. The LTE communications network 24 includes an evolved universal terrestrial radio access network (E-UTRAN) 26, an evolved packet core (EPC) network 28, and a packet data network (PDN) 30. Together, the EPC network 28 and the PDN 30 may be referred to generally as a core network 31. The E-UTRAN 26 includes one or more evolved node Bs (eNBs) 32, which may facilitate a connection from user equipment (UE) 34 located in the E-UTRAN 26 to one or more resources or services offered by the EPC network 28. The EPC network 28 includes a serving gateway (S-GW) 36, a mobility management entity (MME) 38, a packet data network (PDN) gateway (P-GW) 40, and a policy charging and rules function (PCRF) 42. The PDN 30 includes an application function (AF) 44.

The S-GW 36 is connected to the E-UTRAN 26 via an S1-U data connection. The MME 38 is connected to the E-UTRAN 26 via an S1-MME control connection. The S-GW 36 and the MME 38 are connected to one another via an S11 control connection. The S-GW 36 and the P-GW 40 are connected to one another via an S5 data connection. The P-GW 40 and the PCRF 42 are connected to one another via a Gx control connection. The P-GW 40 is connected to the PDN 30, and thus the AF 44, via an SGi data connection. Finally, the PCRF 42 is connected to the PDN 30, and thus the AF 44, via an Rx control connection, and is connected to the S-GW 36 via a Gxc control connection.

The S-GW 36 serves as the main node responsible for connecting the E-UTRAN 26 to the EPC network 28 and acts as a mobility anchor for the UE 34 as the UE 34 moves between eNBs 32 in the E-UTRAN 26. The MME 38 is responsible for managing bearers, handling UE 34 transitions, and performing authentication of the UE 34. The P-GW 40 connects the EPC network 28 to the PDN 30 and performs such functions as allocating IP addresses and enforcing QoS rules provided by the PCRF 42. The PCRF 42 is generally responsible for QoS handling and charging.

Figure 2B:
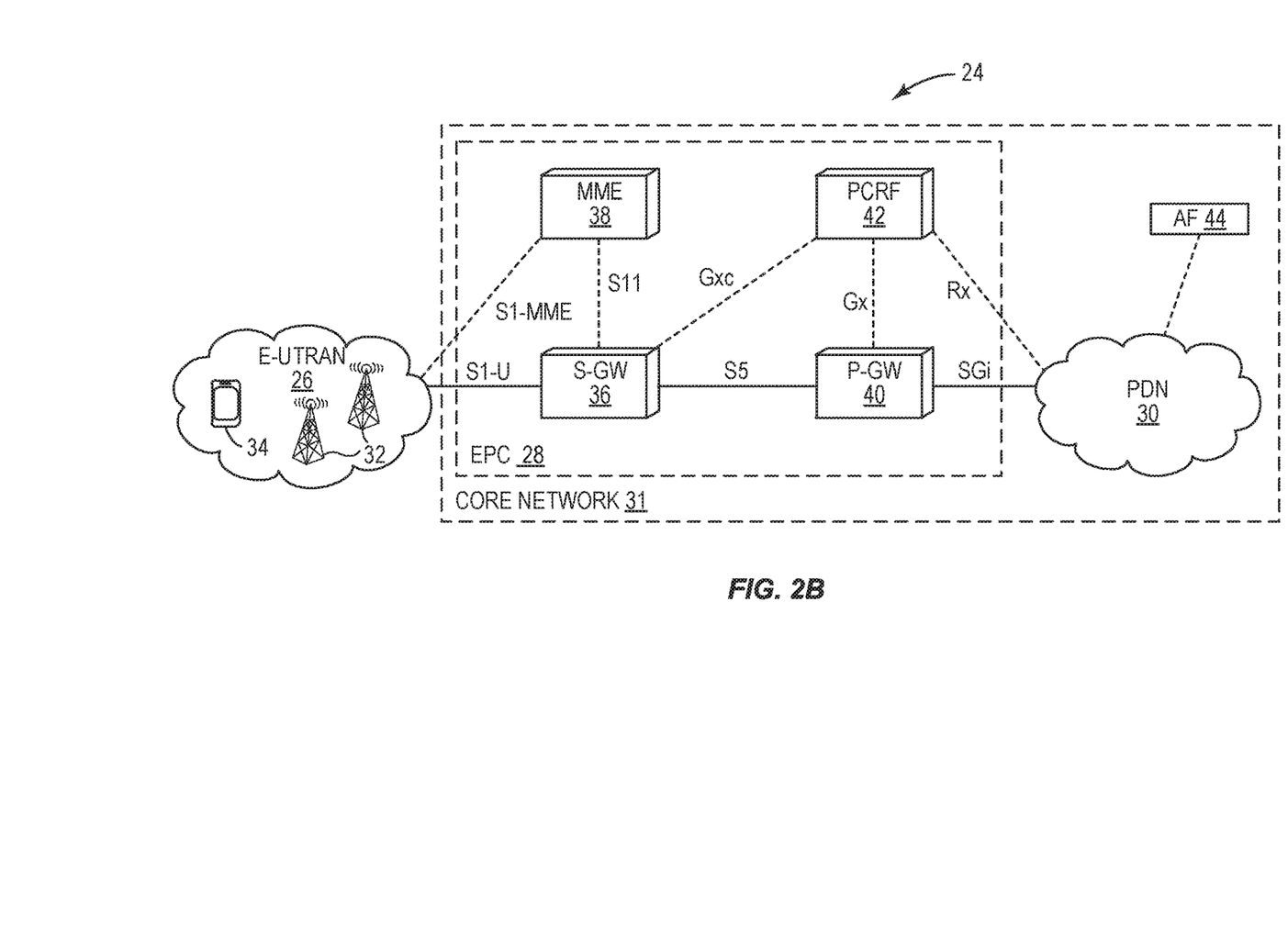
FIG. 2B is a block diagram illustrating an alternative configuration of the LTE communications network shown in FIG. 2A, which may be used according to the principles described in the present disclosure to ensure that a transfer of data content is completed before a transfer deadline while efficiently allocating radio resources for the transfer of the data content.

FIG. 2B shows the LTE communications network 24 according to another embodiment of the present disclosure. As shown in FIG. 2B, the AF 44 is located outside of the PDN 30, such that the AF 44 connects to the EPC 28 via the PDN 30. In other embodiments, the AF 44 may directly connect to the PCRF 42 from outside of the PDN 30. Although the principles of the present disclosure are discussed with respect to the LTE communications network 24 shown in FIGS. 2A and 2B, the disclosure is not so limited. That is, the principles of the present disclosure may be applied to any suitable type of cellular communications network or to any suitable type of wireless communications system in general.

As discussed above, a particular resource or service may demand a minimum quality of service (QoS) in order to deliver a desirable user experience in the LTE communications network 24. In particular, it may be desirable for a transfer of data content associated with a resource or service to complete before a specified transfer deadline. Conventional delay-based scheduling strategies rely on one or more QoS parameters in a QoS class identifier (QCI), which are not individually tailored to a particular transfer of data content. Such a generalization of QoS parameters is unsuited to ensuring that one or more transfers of data content are completed before a transfer deadline, and further may result in the inefficient allocation of radio resources in a wireless communications network due to the unnecessary scheduling and/or prioritization of radio resources for a requested resource and/or service. Specifically, a delay-based scheduling strategy generally only looks at each packet of a larger set of data content to determine if the QoS parameters have been met, and is incapable of viewing the overall context of the transfer of the data content. Further, delay-based scheduling is based on the generalized QoS parameters discussed above, and is thus not tailored to any specific transfer of data content.

Accordingly, a delay-based scheduling strategy may fail to ensure that a transfer of data content is completed before a transfer deadline, and further result in sub-optimal use of radio resources. Additionally, current E-RAB setup procedures establish a single QoS, which is used for the life of the E-RAB. As a result, different transfers of data content using the same E-RAB must use the same QoS parameters, which once again may result in sub-optimal use of radio resources for the same reasons discussed above.

Figure 3:
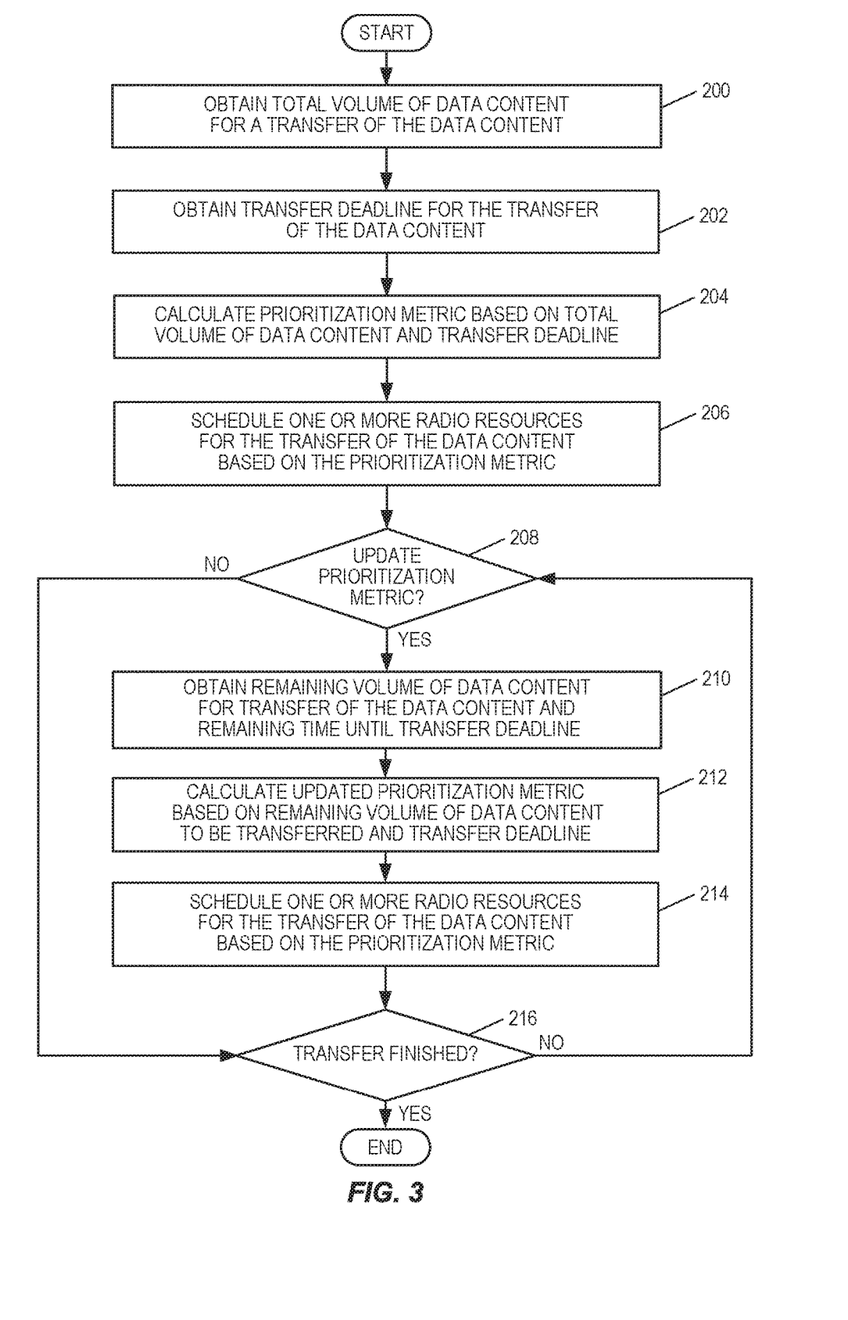
FIG. 3 is a flow chart illustrating a method of operating a radio access node according to one embodiment of the present disclosure.

FIG. 3 is a flow chart illustrating a method of operating a radio access node in a wireless communications network according to one embodiment of the present disclosure. To begin, the radio access node obtains a total volume of the data content for a transfer of the data content between the radio access node and a wireless communications device in the wireless communications network (step 200). As referred to herein, the total volume of the data content is the total size (e.g., in kilobytes (kB), megabytes (MB), gigabytes (GB), etc.) of the data associated with the transfer of the data content.

For example, the data content may be a webpage, a purchased application, or a multimedia file, in which case the total volume of the data content would be the total size of the webpage including all of the resources associated therewith, the total size of the purchased application, or the total size of the multimedia file, respectively. In one embodiment, the wireless communications network is the E-UTRAN 26, the radio access node is one of the eNBs 32, and the wireless communications device is the UE 34. In one embodiment, obtaining the total volume of the data content includes receiving the total volume of the data content from a core network node in an associated core network. Further, the core network node may be the AF 44 and the associated core network may be the EPC network 28.

Generally, the total volume of the data content may be obtained by any suitable means, such as by in-band signaling, out-of-band control signaling, or proprietary signaling. As discussed herein, in-band messages refer to messages sent alongside data associated with requested resources and/or services. For example, in-band messages may refer to messages sent via the data connections S1-U, S5, and/or SGi, shown in FIGS. 2A and 2B. Further as discussed herein, out-of-band control messages refer to messages sent via dedicated control paths, separate from the data associated with requested resources and/or services. For example, out-of-band control messages may refer to messages sent via the control connections S1-MME, S11, Gxc, Gx, Rx, shown in FIGS. 2A and 2B.

In one embodiment, receiving the total volume of the data content at the radio access node via one or more out-of-band control messages may include receiving the total volume of the data content in an information element (IE) included in an INITIAL CONTEXT SETUP, an E-RAB SETUP, an E-RAB MODIFY, or a HANDOVER REQUEST message. While not essential, details of the INITIAL CONTEXT SETUP REQUEST, the E-RAB SETUP, the E-RAB MODIFY, and the HANDOVER REQUEST messages are discussed in 3GPP Technical Specification 36.413, version 12.1.0, sections 8.2-8.4, which are herein incorporated by reference in their entirety. Notably, an INITIAL CONTEXT SETUP REQUEST, an E-RAB SETUP, an E-RAB MODIFY, and a HANDOVER REQUEST message may include a guaranteed bitrate (GBR) quality of service (QoS) information IE, which can be used to communicate the total volume of the data content. Accordingly, obtaining the total volume of the data content may include receiving the total volume of the data content in a GBR QoS information IE included in one of an INITIAL CONTEXT SETUP, an E-RAB SETUP, an E-RAB MODIFY, or a HANDOVER REQUEST message.

While not essential, details of the GBR QoS Information IE are discussed in 3GPP Technical Specification 36.413, version 12.1.0, section 9.2.1.18, which is herein incorporated by reference in its entirety. Generally, a GBR QoS Information IE is used to communicate configuration parameters for the establishment of GBR E-RABs, which are subsequently used by an eNB in an admission control process to determine whether or not resources exist for the establishment of the particular E-RAB. In other words, messages relating to the establishment of non-GBR E-RABs generally do not include a GBR QoS Information IE. In some embodiments, the present disclosure proposes to use the GBR QoS Information IE to communicate the total volume of the data content regardless of whether the particular E-RAB used for the transfer of the data content is a GBR E-RAB or a non-GBR E-RAB.

The radio access node also obtains a transfer deadline for the transfer of the data content (step 202). Obtaining the transfer deadline may include obtaining the transfer deadline via in-band signaling, out-of-band control signaling, or proprietary signaling, as discussed above. Further, in some embodiments, the transfer deadline is communicated in a GBR QoS Information IE included in an INITIAL CONTEXT SETUP, an E-RAB SETUP, an E-RAB MODIFY, or a HANDOVER REQUEST message, and obtaining the transfer deadline includes extracting the transfer deadline from the GBR QoS Information IE.

The radio access node then calculates a prioritization metric for the transfer of the data content based on the total volume of the data content and the transfer deadline (step 204). In one embodiment, a bitrate for the wireless communications device is also used to calculate the prioritization metric, such that the prioritization metric is calculated as shown in Equation (1).

$$P_m = \frac{V_{DC}}{(T_{TD} * R_{WCD})} \quad (1)$$

Where $P_m$ is the prioritization metric, $V_{DC}$ is the total remaining volume of the data content, $T_{TD}$ is the time remaining until the transfer deadline occurs, and $R_{WCD}$ is the bitrate for the wireless communications device. The bitrate for the wireless communications device may be maintained by the radio access node and/or calculated in many different ways. For example, the bitrate for the wireless communications device may be calculated based on a filtered channel quality indicator (CQI) for the wireless communications device. Specifically, from the CQI for the wireless communications device, a modulation and code rate can be selected, which gives a number of bits per physical resource block (PRB). The bitrate for the wireless communications device can then be estimated by multiplying the number of bits per PRB by the number of PRBs expected to serve the wireless communications device. Alternatively, the bitrate for the wireless communications device can be estimated based on the scheduling history of the wireless access node, for example, by averaging scheduled transport block sizes from time periods when the wireless communications device had data in the buffer over time.

Once the prioritization metric is calculated, the radio access node uses the prioritization metric to schedule one or more radio resources for the transfer of the data content based on the prioritization metric (step 206). The prioritization metric allows the radio access node to more accurately assess the radio resource requirements of a particular resource and/or service. Accordingly, the efficiency of radio resource allocation in the wireless communications network can be increased. In one embodiment, the radio access node prioritizes traffic when the prioritization metric is above a predetermined threshold, while assigning all other traffic a default priority. By using the prioritization metric to schedule one or more radio resources in the radio access node, the transfer of the data content may be completed before the transfer deadline, while improving the efficiency of radio resource usage in the radio access node.

In order to ensure that the transfer of the data content is completed before the transfer deadline, and in order to increase the efficiency of radio resource allocation in the wireless communications network, it may be desirable to update the prioritization metric during the course of the transfer of the data content. Accordingly, the radio access node makes a decision whether the prioritization metric should be updated (step 208). In one embodiment, the decision whether to update the prioritization metric includes checking if a predetermined period of time has passed since the last calculation of the prioritization metric. In an additional embodiment, the prioritization metric is updated every N transmission time intervals (TTIs). Accordingly, the decision whether to update the prioritization metric may include determining if N TTIs have occurred since the last time the prioritization metric was calculated.

If the prioritization metric should be updated, the radio access node obtains the remaining portion of the total volume of the data content to be transferred and the remaining time until the transfer deadline (step 210). Obtaining the remaining portion of the total data volume of the data content to be transferred and the time remaining until the transfer deadline may include obtaining the remaining portion of the total volume of the data content to be transferred via in-band signaling, out-of-band control signaling, or proprietary signaling, as discussed above. Further, obtaining the remaining portion of the total volume of the data content to be transferred and the time remaining until the transfer deadline may include extracting the transfer deadline from a GBR QoS Information IE included in an INITIAL CONTEXT SETUP, an E-RAB SETUP, an E-RAB MODIFY, or a HANDOVER REQUEST message. In one embodiment, the remaining portion of the total data volume of the data content to be transferred is obtained by measuring a transferred volume of the data content.

The radio access node then calculates an updated prioritization metric based on the remaining portion of the total volume of the data content to be transferred and the time remaining until the transfer deadline (step 212). In one embodiment, the bitrate for the wireless communications device is also used to calculate the updated prioritization metric according to Equation 1, where the total volume of the data content is replaced by the remaining portion of the total volume of the data content to be transferred.

Once the updated prioritization metric is calculated, the radio access node schedules one or more radio resources for the transfer of the data content (step 214). By scheduling one or more radio resources based on the updated prioritization metric, the transfer of data content may be completed before the transfer deadline, while improving the efficiency of radio resource usage in the radio access node by allowing the radio access node to dynamically change the prioritization metric (and thus scheduling) based on network conditions. The radio access node then determines if the transfer of the data content is finished (step 216). If the transfer of the data content is finished, the process ends. In one embodiment, if the transfer of the data content is finished, an updated prioritization metric of zero is calculated at the radio access node, which indicates to the radio access node that traffic for the transfer of the data content should no longer be prioritized. If the transfer of the data content is not finished, the process returns to step 208 to determine if an update to the prioritization metric is required. If an update to the prioritization metric is not required, the process returns to step 216 to determine if the transfer of the data content is finished.

Figure 4:
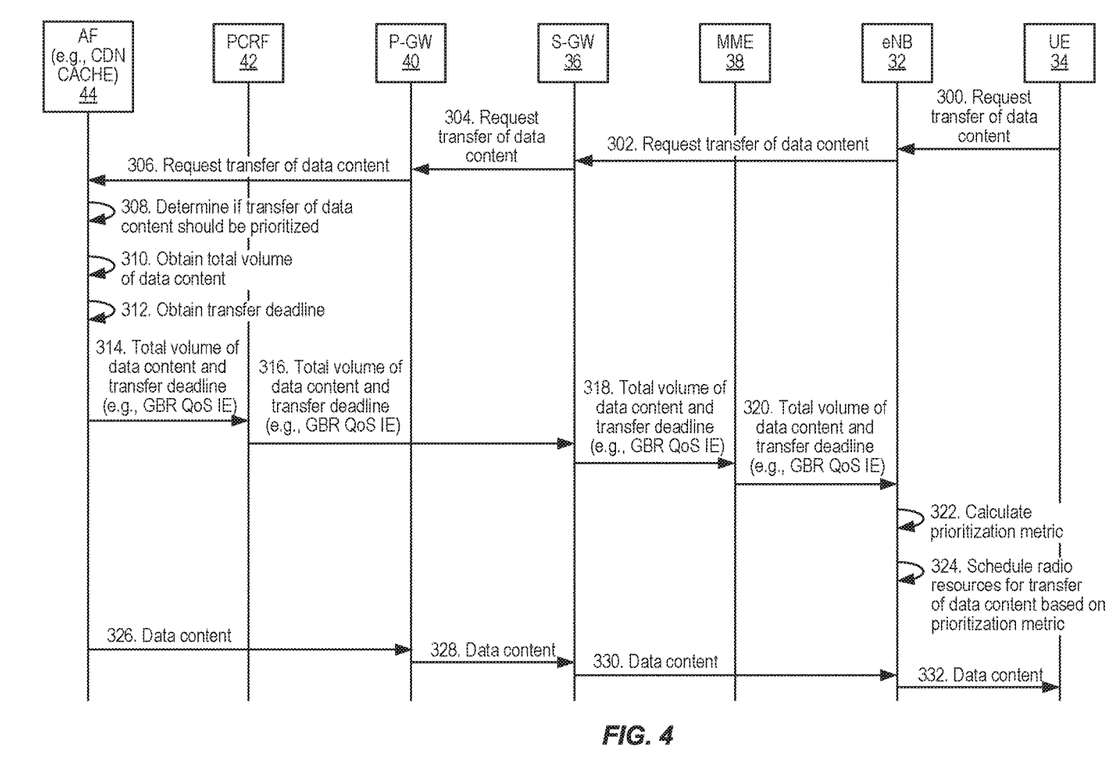
FIG. 4 is a call flow diagram illustrating a method of operating a communications network according to one embodiment of the present disclosure.

FIG. 4 is a call flow diagram illustrating a method of operating the LTE communications network 24 according to one embodiment of the present disclosure. First, the UE 34 sends a request for a transfer of data content to the eNB 32 (step 300). In one embodiment, the request for the transfer of the data content is a request that should be completed before a transfer deadline due to one or more QoS parameters associated with a particular resource and/or service. For example, the request for the transfer of the data content could be a request to stream a multimedia file, a request to make an e-commerce purchase, or a request for location information such as a map of a particular area. As discussed above, failing to deliver data content in one or more of these examples in a timely fashion may be highly disruptive to an end user, and thus a transfer deadline may be imposed to ensure a desirable user experience.

The eNB 32 forwards the request for the transfer of the data content to the S-GW 36 (step 302), which in turn forwards the request to the P-GW 40 (step 304). The P-GW 40 then forwards the request for the transfer of the data content to the AF 44 (step 306). In one embodiment, the AF 44 is a caching node for a content delivery network (CDN). Accordingly, the AF 44 may include a cache of the requested data content. The AF 44 then determines if the transfer of the data content should be prioritized (step 308). In one embodiment, determining if the transfer of the data content should be prioritized includes checking one or more preconfigured QoS recommendations for the requested data content, and determining if the data content should be transferred before a transfer deadline in order to ensure a desirable user experience. If the transfer of the data content should not be prioritized, the LTE communications network 24 may proceed to operate normally.

If the transfer of the data content should be prioritized, a total volume of the data content is obtained by the AF 44 (step 310). Since the AF 44 may include a cache of the requested data content as discussed above, the AF 44 may already know the total volume of the data content based on the size of the cache associated with the data content. In one embodiment, the total volume of the data content is obtained by accessing historical information regarding one or more previous transfers of the data content. A transfer deadline for the transfer of the data content is also obtained by the AF 44 (step 312). The transfer deadline may be based on the particular data content requested by the UE 34, as different resources and/or services may require a different QoS in order to maintain a desirable user experience. In one embodiment, the transfer deadline is determined based upon one or more preconfigured QoS recommendations for a particular resource and/or service. The total volume of the data content and the transfer deadline are then communicated from the AF 44 to the PCRF 42 (step 314). In one embodiment, the total volume of the data content and the transfer deadline are communicated from the AF 44 to the PCRF 42 via a GBR QoS Information IE, such as in an INITIAL CONTEXT SETUP, an E-RAB SETUP, an E-RAB MODIFY, or a HANDOVER REQUEST message, as discussed in detail above. The total volume of the data content and the transfer deadline are then forwarded from the PCRF 42 to the S-GW 36 (step 316), from the S-GW 36 to the MME 38 (step 318), and from the MME 38 to the eNB 32 (step 320).

The eNB 32 then calculates a prioritization metric for the transfer of the data content (step 322). In one embodiment, the prioritization metric is calculated using the total volume of the data content and the transfer deadline. In an additional embodiment, the prioritization metric is calculated using the total volume of data content, the transfer deadline, and a bitrate for the UE 34, which may be obtained as described above. Specifically, the prioritization metric may be calculated according to Equation (1) described above. The eNB 32 then schedules one or more radio resources based on the prioritization metric (step 324). In one embodiment, the radio access node prioritizes traffic when the prioritization metric is above a predetermined threshold, while assigning all other traffic a default priority. By using the prioritization metric to schedule one or more radio resources in the radio access node, the transfer of the data content may be completed before the transfer deadline, while improving the efficiency of radio resource usage in the radio access node. Finally, the data content is transferred from the AF 44 to the P-GW 40 (step 326), from the P-GW 40 to the S-GW 36 (step 328), from the S-GW 36 to the eNB 32 (step 330), and finally from the eNB 32 to the UE 34 (step 332).

Throughout the transfer of the data content, it may become apparent, for example, due to changes in network conditions, that the prioritization metric should be updated. If the prioritization metric is too low, the transfer of the data content will not finish before the transfer deadline, thereby degrading the quality of the user experience for the particular resource and/or service the data content is associated with. If the prioritization metric is too fast, the efficiency of radio resource allocation in the E-UTRAN 26 may suffer. Accordingly, it may be desirable to update the prioritization metric one or more times throughout the transfer of the data content. In one embodiment, the prioritization metric is updated every N TTIs during the transfer of the data content, which ensures that the transfer of the data content finishes before the transfer deadline while also increasing the efficiency of radio resource allocation in the E-UTRAN 26.

Figure 5:
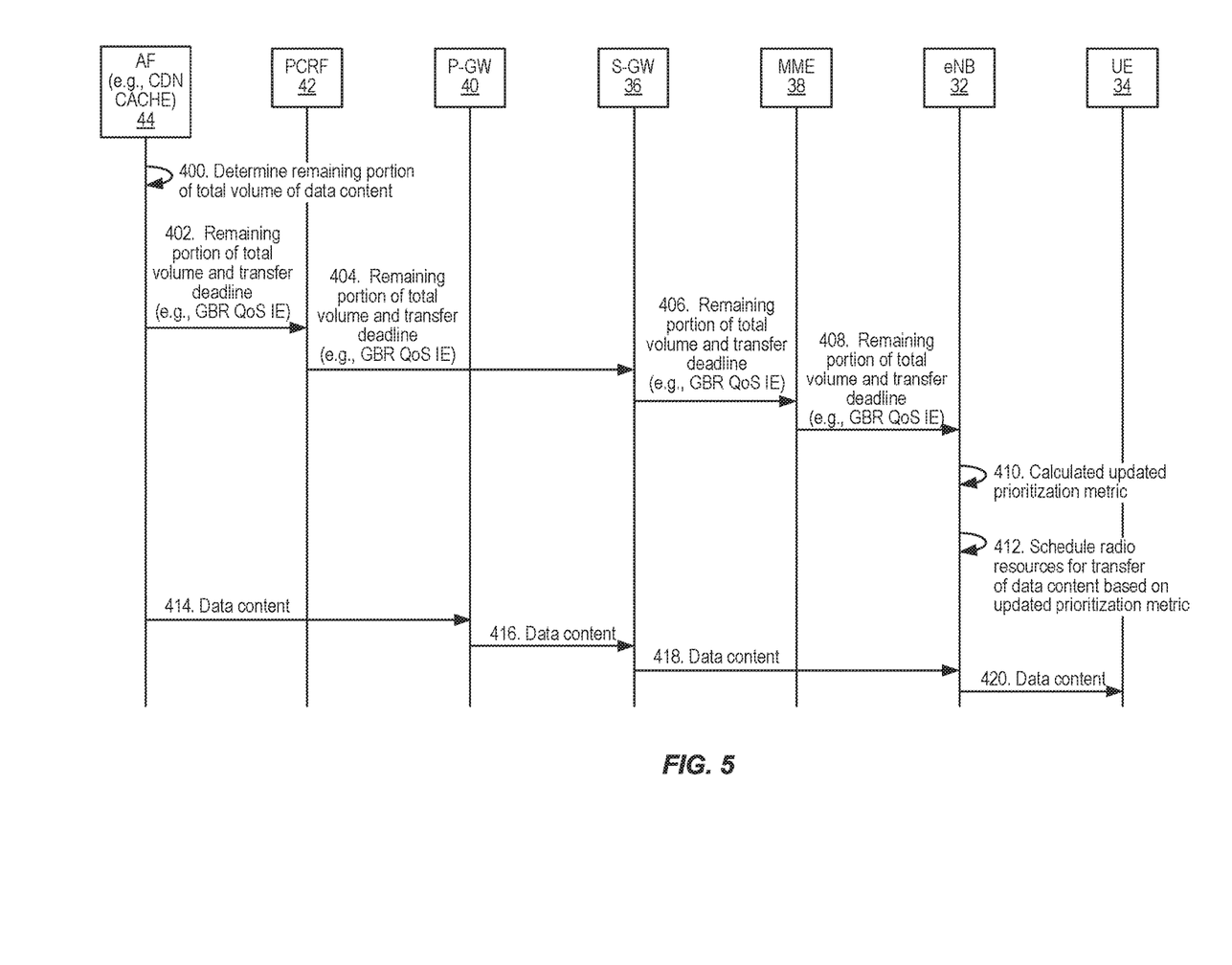
FIG. 5 is a call flow diagram illustrating a method of operating a communications network according to an additional embodiment of the present disclosure.

FIG. 5 is a call flow diagram illustrating a method of operating the LTE communications network 24 to update the prioritization metric according to one embodiment of the present disclosure. This process may be used to, e.g., update the prioritization metric of FIG. 4 every N TTIs during the transfer of the data content. First, the AF 44 obtains the remaining portion of the total volume of the data content to be transferred (step 400). In one embodiment, the remaining portion of the total volume of the data content is obtained by subtracting the volume of the data content that has already been transferred from the AF 44 to the UE 34 from the total volume of the data content. The remaining portion of the total volume of the data content and, optionally, the time remaining until the transfer deadline, are then communicated from the AF 44 to the PCRF 42 (step 402), from the PCRF 42 to the S-GW 36 (step 404), from the S-GW 36 to the MME 38 (step 406), and from the MME 38 to the eNB 32 (step 408). The remaining portion of the total volume of the data content and the remaining time until the transfer deadline may be communicated in a GBR QoS Information IE. Since the E-RAB for the transfer of the data content will have already been established at this point in time, the GBR QoS Information IE may be communicated in an E-RAB MODIFY message. In one embodiment, the remaining portion of the total volume of the data content and the remaining time until the transfer deadline are communicated via in-band signaling.

The eNB 32 then calculates an updated prioritization metric based on the remaining portion of the total volume of the data content to be transferred (step 410). In one embodiment, the updated prioritization metric may be calculated using Equation (1) above, but using the remaining portion of the total volume rather and the remaining amount of time before the transfer deadline for the calculation. The eNB 32 then schedules one or more radio resources for the transfer of the data content based on the updated prioritization metric (step 412). Finally, the data content is transferred from the AF 44 to the P-GW 40 (step 414), from the P-GW 40 to the S-GW 36 (step 416), from the S-GW 36 to the eNB 32 (step 418), and from the eNB 32 to the UE 34 (step 420).

In one embodiment, the eNB 32 calculates an updated prioritization metric independently. Specifically, because the eNB 32 generally knows how much of the data content it has transferred to the UE 34 and knows how much time has passed since the transfer of the data content, the eNB 32 may be capable of calculating an updated prioritization metric without receiving additional messages from the AF 44.

Updating the prioritization metric throughout the transfer of the data content ensures that the data content will be transferred to the UE 34 before the transfer deadline. Further, updating the prioritization metric throughout the transfer of the data content results in the efficient allocation of radio resources in the E-UTRAN 26.

In the embodiments discussed above, various operations are described in a number of discrete steps, which appear in a particular order. However, the present disclosure is not so limited. The various operations described above in any of the embodiments may be further broken down into additional steps, or may be combined together into a single discrete step. Further, the various operations need not be performed in the order of presentation unless explicitly stated otherwise.

Figure 6:
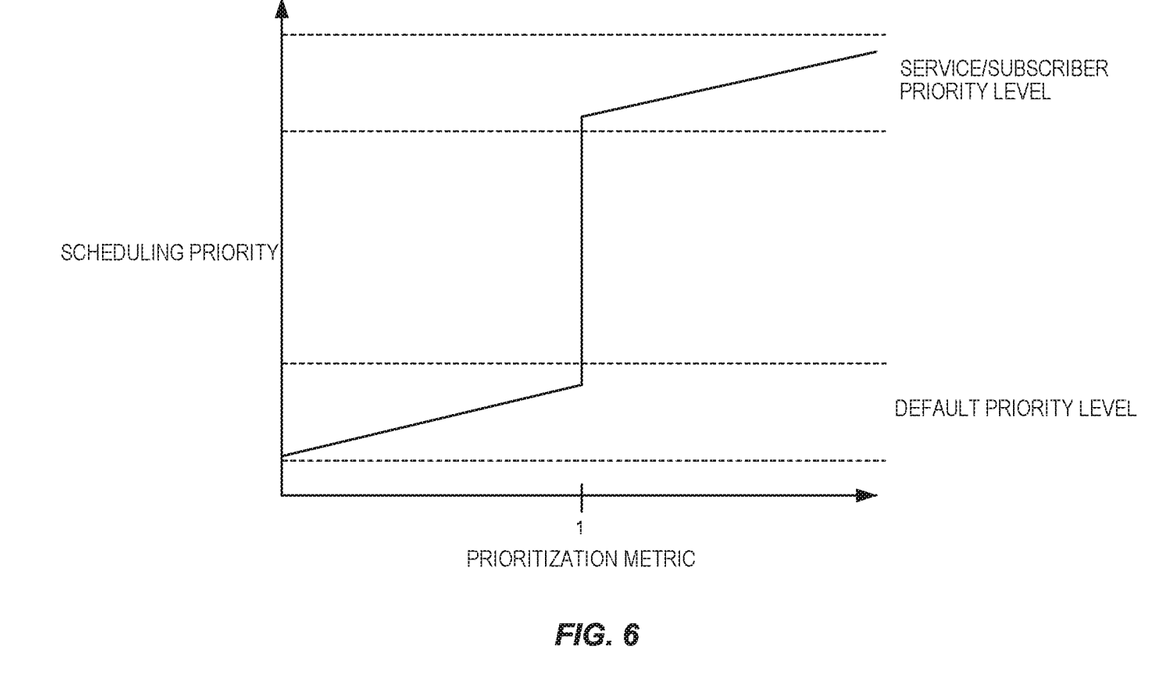
FIG. 6 is a chart illustrating a method of assigning a scheduling priority according to one embodiment of the present disclosure.

FIG. 6 is a chart illustrating an exemplary scheduling scheme according to the present disclosure. The x-axis of the chart in FIG. 6 represents the calculated prioritization metric $P_m$ discussed above, while the y-axis of the chart represents the scheduling priority assigned by a radio access node. As shown in FIG. 6, if the prioritization metric is below a predetermined threshold (e.g., 1), a default priority level is assigned to the particular traffic. However, if the prioritization metric is above the predetermined threshold, the priority level of the particular traffic is increased.

Figure 7:
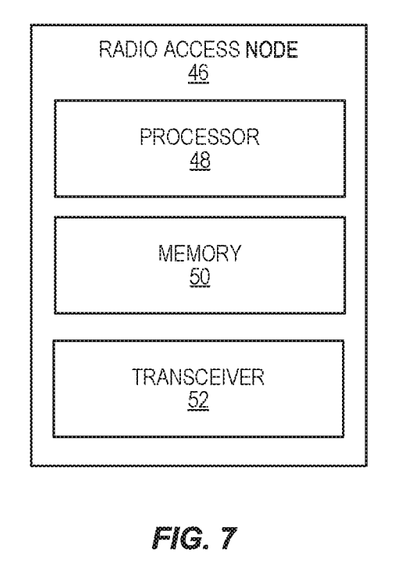
FIG. 7 is a block diagram illustrating a radio access node according to one embodiment of the present disclosure.

FIG. 7 is a block diagram illustrating the structure of a radio access node 46 suitable for use in any of the methods discussed above. The radio access node 46 includes a processor 48, a memory 50, and a transceiver 52. In one embodiment, the memory 50 may contain software which is executable by the processor whereby the radio access node 46 operates according to any one of the embodiments described above. For instance, in one embodiment, the radio access node 46 is operative to obtain a total data content volume for a transfer of the data content between the radio access node and a wireless communications device, obtain a transfer deadline for the transfer of the data content, calculate a prioritization metric for the transfer of the data content based on the total data content volume and the transfer deadline, and schedule one or more radio resources for the transfer of the data content based on the prioritization metric.

Figure 8:
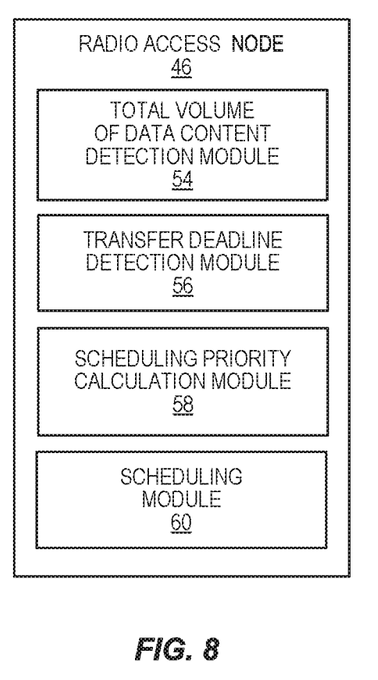
FIG. 8 is a block diagram illustrating a radio access node according to one embodiment of the present disclosure.

FIG. 8 is a block diagram illustrating the structure of the radio access node 46 shown in FIG. 7 according to an additional embodiment of the present disclosure. The radio access node 46 in FIG. 8 includes a total volume of data content detection module 54, a transfer deadline detection module 56, a scheduling priority calculation module 58, and a scheduling module 60, each of which is implemented in software that is stored in a computer readable medium (e.g., memory) and executed by a processor of the radio access node 46. In one embodiment, the total volume of data content detection module 54 is operative to obtain a total data content volume for a transfer of the data content between the radio access node 46 and a wireless communications device, the transfer deadline detection module 56 is operative to obtain a transfer deadline for the transfer of the data content, the scheduling priority calculation module 58 is operative to calculate a prioritization metric for the transfer of the data content based on the total volume of the data content and the transfer deadline, and the scheduling module 60 is operative to schedule one or more radio resources for the transfer of the data content based on the prioritization metric.

In one embodiment, a computer program including instructions, which, when executed by at least one processor, cause the at least one processor to carry out the functionality of the radio access node 46 according to any one of the embodiments described herein is provided. In one embodiment, a carrier containing the aforementioned computer program product is provided. The carrier may be one of an electronic signal, an optical signal, a radio signal, or a computer readable storage medium (e.g., a non-transitory computer readable storage medium such as the memory 50).

The following acronyms are used throughout this disclosure.

3GPP 3$^{rd}$ Generation Partnership Project
AF Application Function
CDN Content Delivery Network
CQI Channel Quality Indicator
eNB Evolved Node B
EPC Evolved Packet Core
E-RAB Evolved Radio Access Bearer
E-UTRAN Evolved Universal Terrestrial Radio Access Network
IP-CAN Internet Protocol Connectivity Access Network
LTE Long Term Evolution
PCRF Policy Charging and Rules Function
PDN Packet Data Network
P-GW Packet Data Network Gateway
PRB Physical Resource Block
QCI QoS Class Identifier
QoS Quality of Service
S-GW Serving Gateway
UE User Equipment
VoIP Voice over Internet Protocol Those skilled in the art will recognize improvements and modifications to the embodiments of the present disclosure. All such improvements and modifications are considered within the scope of the concepts disclosed herein and the claims that follow.

What is claimed is:

1. A method of operating a radio access node for a wireless communications network comprising:
    obtaining a total volume of data content for a transfer of the data content between the radio access node and a wireless communications device;
    obtaining a transfer deadline for the transfer of the data content;
    calculating a prioritization metric for the transfer of the data content based on the total volume of the data content and the transfer deadline where calculating the prioritization metric comprises dividing a remaining total data content volume by: a time remaining until the transfer deadline multiplied by a communication bitrate for the wireless communications device; and
    scheduling one or more radio resources for the transfer of the data content based on the prioritization metric.

2. The method of claim 1 wherein scheduling the one or more radio resources for the transfer of the data content comprises assigning a first scheduling priority if the prioritization metric is below a predetermined threshold, and assigning a second scheduling priority if the prioritization metric is above the predetermined threshold.

3. The method of claim 1 further comprising:
    calculating an updated prioritization metric for the transfer of the data content based on an estimate of a remaining portion of the total volume of the data content to be transferred and the remaining time until the transfer deadline for the transfer of the data content; and
    scheduling the one or more radio resources for the transfer of the data content based on the updated scheduling priority.

4. The method of claim 3 wherein calculating an updated prioritization metric for the transfer of the data content comprises calculating an updated prioritization metric for the transfer of the data content periodically.

5. The method of claim 4 wherein calculating an updated prioritization metric for the transfer of the data content comprises calculating an updated prioritization metric for the transfer of the data content every N transmission time intervals (TTIs) where N is an integer greater than or equal to 1.

6. The method of claim 3 wherein calculating an updated prioritization metric for the transfer of the data content comprises calculating an updated prioritization metric each time a portion of the data content is transferred from the radio access node to the wireless communications device.

7. The method of claim 1 wherein:
obtaining the total data content volume comprises receiving the total data content volume directly or indirectly from a network node in an associated core network; and
obtaining the transfer deadline comprises receiving the transfer deadline directly or indirectly from the network node in the associated core network.

8. The method of claim 7 wherein the associated core network includes an evolved packet core (EPC) network and the radio access node is an evolved node B (eNB).

9. The method of claim 7 wherein:
receiving the total data content volume directly or indirectly from the network node comprises receiving the total data content volume directly or indirectly from the network node via in-band signaling; and
receiving the transfer deadline directly or indirectly from the network node comprises receiving the transfer deadline directly or indirectly from the network node via in-band signaling.

10. The method of claim 7 wherein:
receiving the total data content volume directly or indirectly from the network node comprises receiving the total data content volume directly or indirectly from the network node via out-of-band control signaling; and
receiving the transfer deadline directly or indirectly from the network node comprises receiving the transfer deadline directly or indirectly from the network node via out-of-band control signaling.

11. The method of claim 7 wherein the network node is an application function (AF).

12. The method of claim 11 wherein:
obtaining the total data content volume for the transfer of the data content comprises obtaining the total data content volume for the transfer of the data content from the AF via a policy charging and rules function (PCRF); and
obtaining the transfer deadline for the transfer of the data content comprises obtaining the transfer deadline for the transfer of the data content from the AF via the PCRF.

13. The method of claim 11 wherein the AF is located in a packet data network (PDN).

14. The method of claim 7 wherein:
receiving the total data content volume directly or indirectly from the network node comprises receiving the total data content volume directly or indirectly from the network node via an evolved radio access bearer (E-RAB) control message; and
receiving the transfer deadline directly or indirectly from the network node comprises receiving the transfer deadline directly or indirectly from the network node via the E-RAB control message.

15. The method of claim 14 wherein the E-RAB control message is a guaranteed bitrate (GBR) quality of service (QoS) information element (IE).

16. The method of claim 1 wherein the transfer of the data content is a download of the data content from the radio access node to the wireless communications device.

17. The method of claim 1 wherein the transfer of the data content is an upload of the data content from the wireless communications device to the radio access node.

18. A device adapted to:
obtain a total data content volume for a transfer of the data content between a radio access node and a wireless communications device;
obtain a transfer deadline for the transfer of the data content;
calculate a prioritization metric for the transfer of the data content based on the total data content volume and the transfer deadline where calculating the prioritization metric comprises being adapted to divide a remaining total data content volume by: a time remaining until the transfer deadline multiplied by a communication bitrate for the wireless communications device; and
schedule one or more radio resources for the transfer of the data content based on the prioritization metric.

19. A device comprising:
a means for obtaining a total data content volume for a transfer of the data content between a radio access node and a wireless communications device;
a means for obtaining a transfer deadline for the transfer of the data content;
a means for calculating a prioritization metric for the transfer of the data content based on the total data content volume and the transfer deadline where calculating the prioritization metric comprises dividing a remaining total data content volume by: a time remaining until the transfer deadline multiplied by a communication bitrate for the wireless communications device; and
a means for scheduling one or more radio resources for the transfer of the data content based on the prioritization metric.

20. A device comprising:
a total data content volume detection module operative to obtain a total data content volume for a transfer of the data content between a radio access node and a wireless communications device;
a transfer deadline detection module operative to obtain a transfer deadline for the transfer of the data content;
a scheduling priority calculation module operative to calculate a prioritization metric for the transfer of the data content based on the total data content volume and the transfer deadline where calculating the prioritization metric comprises being operative to divide a remaining total data content volume by a time remaining until the transfer deadline multiplied by a communication bitrate for the wireless communications device; and
a scheduling module operative to schedule one or more radio resources for the transfer of the data content based on the prioritization metric.

21. A radio access node comprising:
a radio transceiver;
a processor; and
memory containing software executable by the processor whereby the radio access node is operative to:
obtain a total data content volume for a transfer of the data content between the radio access node and a wireless communications device;
obtain a transfer deadline for the transfer of the data content;
calculate a prioritization metric for the transfer of the data content based on the total data content volume and the transfer deadline where calculating the prioritization metric comprises being operative to divide a remaining total data content volume by a time remaining until the transfer deadline multiplied by a communication bitrate for the wireless communications device; and
schedule one or more radio resources for the transfer of the data content based on the prioritization metric.

\* \* \* \* \*